(12) United States Patent
Cho

(10) Patent No.: US 11,603,682 B2
(45) Date of Patent: Mar. 14, 2023

(54) BI-DIRECTIONAL DOOR OPENING STRUCTURE

(71) Applicants: Hyundai Motor Company, Seoul (KR); Kia Motors Corporation, Seoul (KR)

(72) Inventor: Ki Hyun Cho, Hwaseong-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 429 days.

(21) Appl. No.: 16/891,361

(22) Filed: Jun. 3, 2020

(65) Prior Publication Data

US 2021/0172213 A1    Jun. 10, 2021

(30) Foreign Application Priority Data

Dec. 10, 2019    (KR) .......................... 10-2019-0163262

(51) Int. Cl.
*E05B 81/20*        (2014.01)
*E05B 81/34*        (2014.01)
(Continued)

(52) U.S. Cl.
CPC ............. *E05B 81/20* (2013.01); *B60J 5/0473* (2013.01); *E05B 81/34* (2013.01); *E05B 81/46* (2013.01); *E05B 81/50* (2013.01); *E05Y 2201/216* (2013.01); *E05Y 2201/426* (2013.01); *E05Y 2201/47* (2013.01); *E05Y 2201/628* (2013.01);
(Continued)

(58) Field of Classification Search
CPC ........... E05Y 2900/531; E05Y 2600/45; E05Y 2201/426; E05Y 2201/216; E05Y 2201/47; E05Y 2201/628; E05Y 2201/702; E05Y 2201/722; B60J 5/0472; B60J 5/0473; B60J 5/067; B60J 5/105; B60J 5/0477;
(Continued)

(56) References Cited

U.S. PATENT DOCUMENTS 2,903,296 A * 9/1959 Barenyi ................. B60J 5/0473
                                                          16/365
3,622,197 A * 11/1971 Vogelei .................. B60J 7/0576
                                                          296/96
(Continued)

FOREIGN PATENT DOCUMENTS

DE    102015211065 A1 * 12/2016
KR        101273070 B1      6/2013
WO    WO-2019081645 A1 *  5/2019

*Primary Examiner* — Kristina R Fulton
*Assistant Examiner* — James E Ignaczewski
(74) *Attorney, Agent, or Firm* — Slater Matsil, LLP

(57) ABSTRACT

A bi-directional door opening structure includes a front door configured to be rotatably opened with respect to a front hinge part positioned in a roof of a vehicle, a rear door configured to be rotatably opened with respect to a rear hinge part positioned in the roof of the vehicle, and a drive unit positioned in the roof at a point where the front door and the rear door are adjacent to each other, and configured to apply an opening force to the front door and the rear door, wherein the drive unit includes a spindle unit configured to open at least one of the front door and the rear door, which has been unlocked by a driving force applied from a driving part, and a differential gear configured to deliver the driving force between the spindle unit and the driving part.

20 Claims, 3 Drawing Sheets

(51) Int. Cl.
*E05B 81/46* (2014.01)
*B60J 5/04* (2006.01)
*E05B 81/50* (2014.01)

(52) U.S. Cl.
CPC ... *E05Y 2201/702* (2013.01); *E05Y 2201/722* (2013.01); *E05Y 2600/45* (2013.01); *E05Y 2900/531* (2013.01)

(58) Field of Classification Search
CPC ...... B60J 5/042; B60J 5/02; B60J 5/10; E05B 81/20; E05B 81/34; E05B 81/46; E05B 81/50
USPC .................................................. 292/201, 144
See application file for complete search history.

(56) References Cited

U.S. PATENT DOCUMENTS

| | | | | |
|---|---|---|---|---|
| 5,992,918 | A * | 11/1999 | Gobart | B60J 5/0473 296/146.13 |
| 7,559,585 | B2 * | 7/2009 | Plesternings | B60J 7/1851 292/216 |
| 8,336,929 | B2 * | 12/2012 | Halliwell | E05B 81/20 292/201 |
| 2013/0099524 | A1 * | 4/2013 | Brown | E05F 15/605 296/146.9 |
| 2021/0146807 | A1 * | 5/2021 | Wood | B60N 2/206 |

\* cited by examiner

[FIG. 1A]
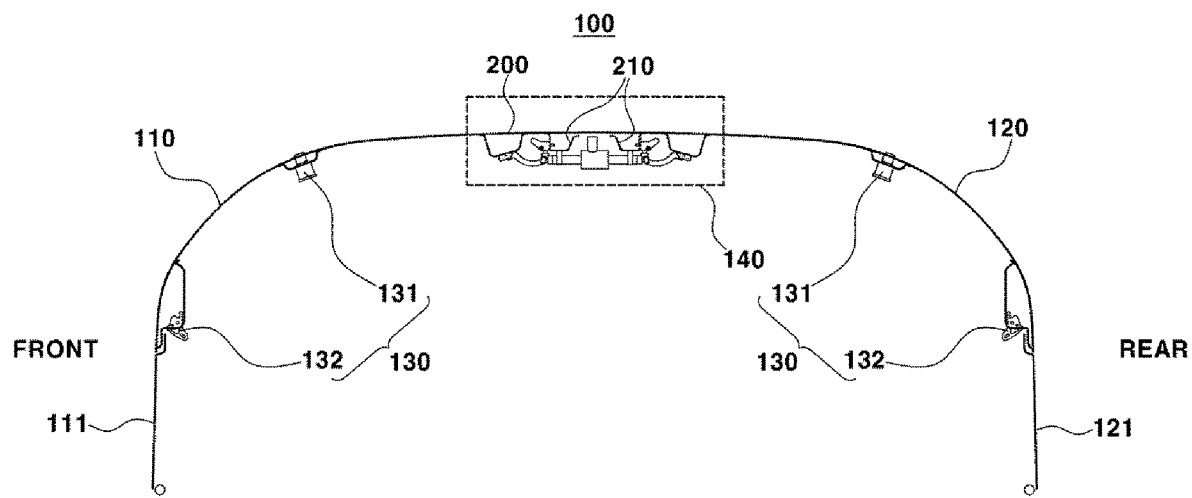
[FIG. 1B]
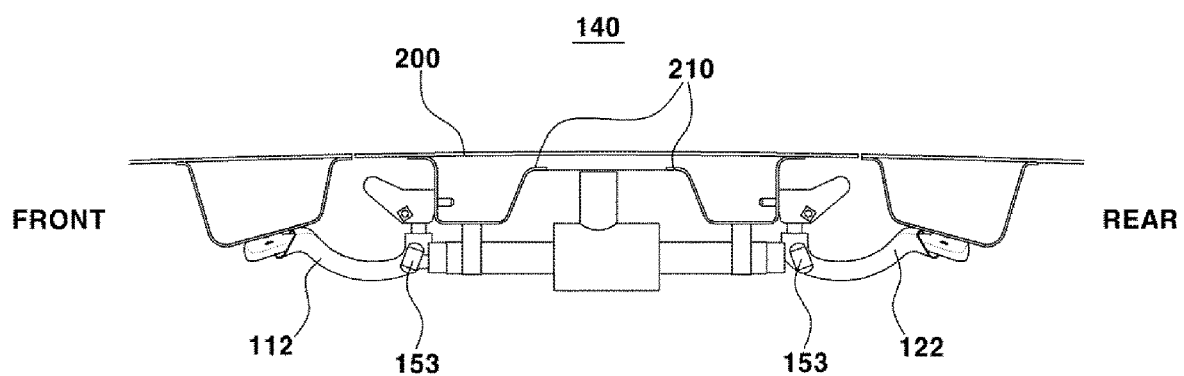

[FIG. 2]
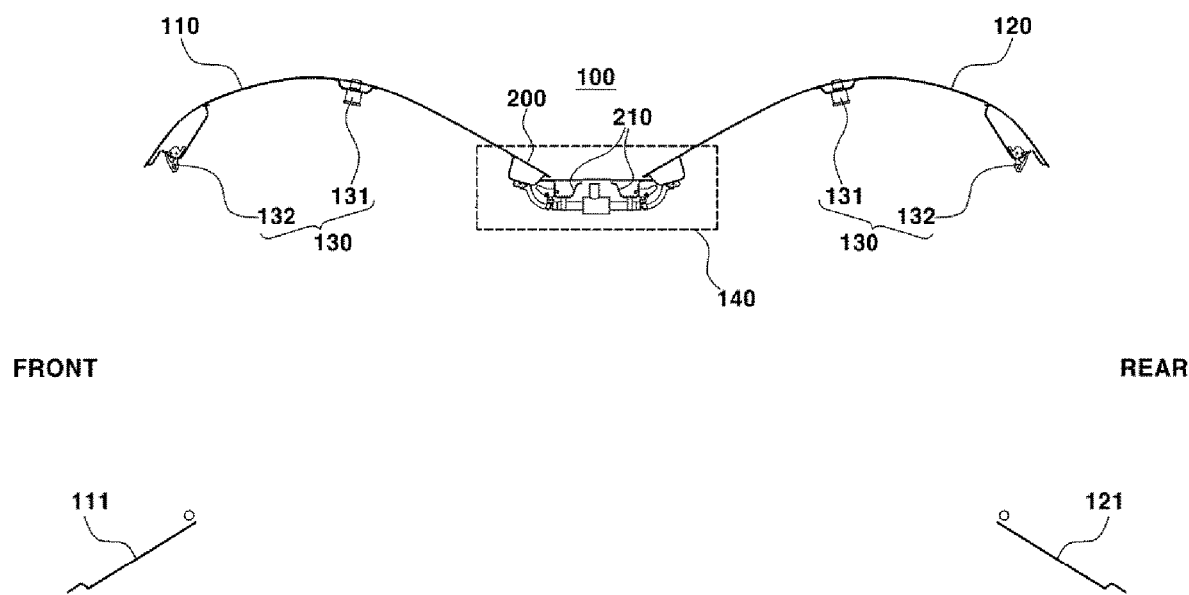
[FIG. 3]
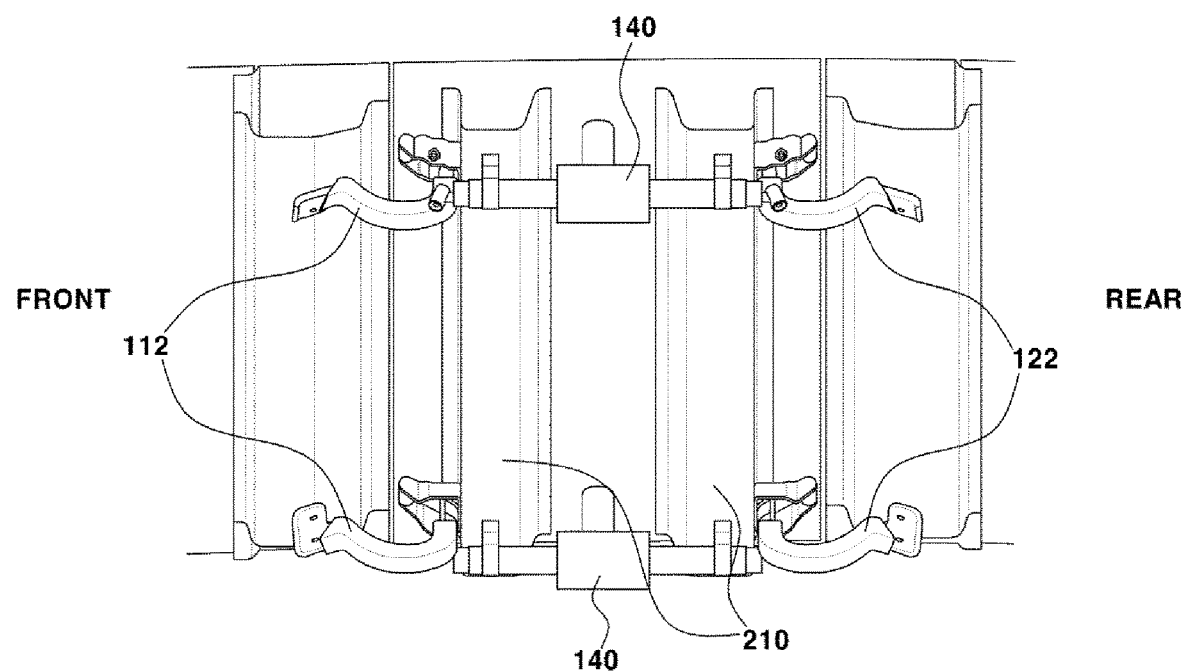

[FIG. 4]
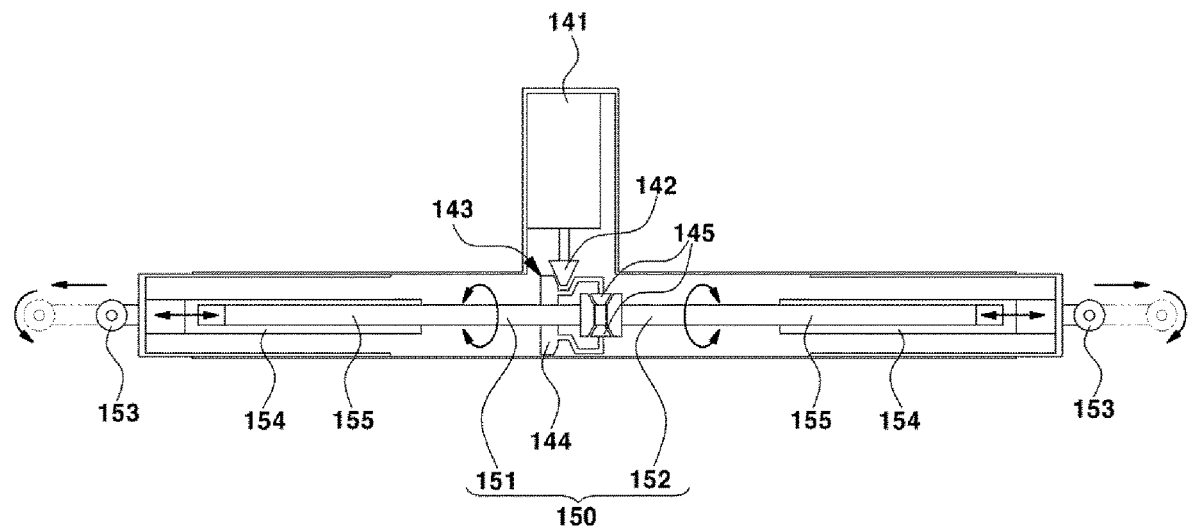
[FIG. 5]
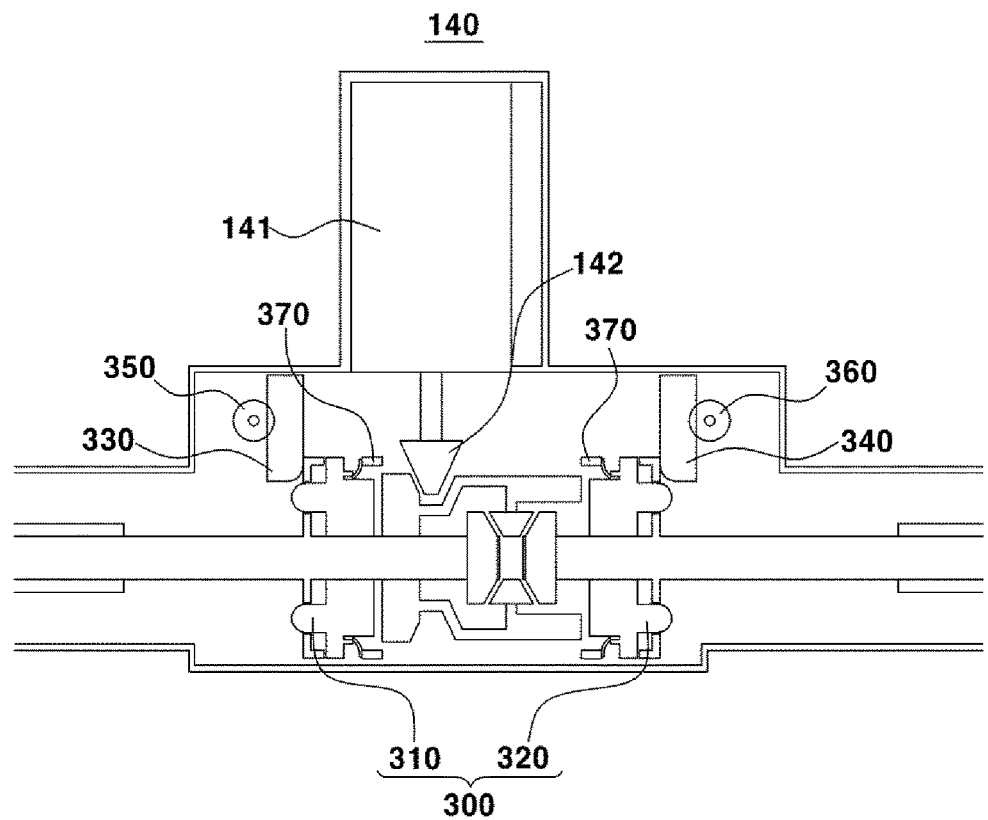

BI-DIRECTIONAL DOOR OPENING STRUCTURE

CROSS-REFERENCE TO RELATED APPLICATIONS

This application claims priority to Korean Patent Application No. 10-2019-0163262, filed on Dec. 10, 2019, which application is hereby incorporated herein by reference.

TECHNICAL FIELD

The present disclosure relates to a bi-directional door opening structure.

BACKGROUND

In general, a door for a vehicle is mounted with a swing structure door that is opened while rotating outwards. The door to which the swing structure has been applied allows a driver or a passenger to release the lock through a handle mounted to the door when getting in and out of the vehicle and then to rotate the door outwards to make a space between the door and a vehicle body so that the driver or the passenger may get in or out through the space.

Meanwhile, the door for the vehicle such as a van or a concept car also applies a sliding structure that is opened and closed while sliding in the front and rear directions.

The door to which the sliding structure has been applied releases the lock through the handle mounted to the door when the driver or the passenger gets in or out of the vehicle and then slides the door in the front and rear directions to make an access space on the side surface of the vehicle body so that the driver or the passenger may get in or out through the space.

Recently, with the development of the vehicle related to the autonomous operation, the criteria of a driver seat for operating the vehicle have been weakened, and various methods for performing getting in and out of the vehicle have been studied.

Therefore, there is a demand for a bi-directionally opened door with respect to a roof of the vehicle to easily access the interior of the vehicle, and there is a demand in the opening structure of both doors facing each other.

The above information disclosed in this Background section is only for enhancement of understanding of the background of the disclosure and accordingly it may contain information that does not form the prior art that is already known to a person of ordinary skill in the art.

SUMMARY

The present disclosure relates to a bi-directional door opening structure. Particular embodiments relate to a bi-directional door opening structure configured to simultaneously or selectively open a front door and a rear door, which have been unlocked, through one driving part in a vehicle mounted with the front door and the rear door that are rotatably opened in the front and rear height directions of the vehicle.

Embodiments of the present disclosure can solve problems in the art, and an embodiment of the present disclosure provides a front door that rotates with respect to one end of the front of a vehicle and a rear door that is rotatably opened with respect to one end of the rear thereof.

Further, another embodiment of the present disclosure provides a bi-directional door opening structure that may integrally or selectively open the front door and the rear door through one driving part.

The embodiments of the present disclosure are not limited to the above-mentioned features, and other features of the embodiments of the present disclosure, which are not mentioned above, may be understood by the following description and more clearly understood by the embodiments of the present disclosure. Further, embodiments of the present disclosure may be realized by the means recited in the claims and a combination thereof.

A bi-directional door opening structure according to embodiments of the present disclosure includes the following configuration.

An embodiment of the present disclosure provides a bi-directional door opening structure including a front door at which one end of the front of a vehicle is rotatably opened with respect to a front hinge part positioned in a roof of the vehicle, a rear door at which one end of the rear of the vehicle is rotatably opened with respect to a rear hinge part positioned in the roof of the vehicle, and a drive unit configured to be positioned in the roof at which the front door and the rear door are adjacent to each other, and to apply an opening force to the front door and the rear door, wherein the drive unit includes a spindle unit configured to open at least one of the front door and the rear door, which have been unlocked by a driving force applied from a driving part, and a differential gear configured to deliver the driving force between the spindle unit and the driving part.

Further, an embodiment of the present disclosure provides the bi-directional door opening structure in which the differential gear includes a first gear fastened to the driving part to apply a rotational force, and a second gear configured to be fastened to the first gear to apply the driving force to the spindle unit, and the spindle unit is configured to face the front door, to face a front spindle moved by the second gear in the longitudinal direction and the rear door, and to be fastened to a rear spindle moved by the second gear in the longitudinal direction.

Further, an embodiment of the present disclosure provides the bi-directional door opening structure in which the front hinge part is positioned to face the front spindle, and the rear hinge part is configured to face the rear spindle.

Further, an embodiment of the present disclosure provides the bi-directional door opening structure in which one end of the front spindle facing the front hinge part and one end of the rear spindle facing the rear hinge part are configured to include a ball bearing configured to apply tension to each of the hinge parts.

Further, an embodiment of the present disclosure provides the bi-directional door opening structure in which the front door and the rear door are configured to be locked and unlocked by a locking part.

Further, an embodiment of the present disclosure provides the bi-directional door opening structure in which the second gear is configured to open the front door or the rear door, which has been unlocked, by driving the spindle unit facing the front door or the rear door.

Further, an embodiment of the present disclosure provides the bi-directional door opening structure in which the second gear includes a clutch unit configured to be fastened selectively to the front spindle and the rear spindle, and the clutch unit is composed of a front clutch fixed to the front spindle and a rear clutch fixed to the rear spindle.

Further, an embodiment of the present disclosure provides the bi-directional door opening structure including a pressure member positioned at a position corresponding to the front clutch and the rear clutch, and the pressure member is configured to be moved so that the clutch of a position corresponding to the unlocked door is fastened to the second gear, if the locking part of the front door or the rear door is released.

Further, an embodiment of the present disclosure provides the bi-directional door opening structure in which the clutch unit is composed of a pressure member composed of a rack gear, and a driving member for applying a driving force so that the clutch unit is fastened to the second gear by the pressure member through the movement of the pressure member.

Further, an embodiment of the present disclosure provides the bi-directional door opening structure in which the clutch unit further includes a return spring configured to return, if the pressure of the pressure member is released.

Further, an embodiment of the present disclosure provides the bi-directional door opening structure in which at least one drive unit is configured in the width direction of the vehicle.

Further, an embodiment of the present disclosure provides the bi-directional door opening structure in which the drive unit is configured to open a preceding-inputted unlocking door and then to open a trailing-inputted unlocking door according to a sequentially-inputted door unlocking input.

The present disclosure may obtain the following effects by the above-described present embodiments and the configuration, coupling, and usage relationship to be described later.

Embodiments of the present disclosure may include a configuration that may perform the integral or selective opening of the front door and the rear door based on one driving part. This configuration can have the effect of simplifying the structure.

Further, embodiments of the present disclosure provide the front door and the rear door that are opened in interlock with the locking part, and have the effect of providing the bi-directional door opening structure that may open the door according to the user's request.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein:

FIG. 1A is a side diagram of a vehicle having a double opening type door, as an embodiment of the present disclosure.

FIG. 1B is a side diagram of the opened state of the vehicle having the double opening type door, as an embodiment of the present disclosure.

FIG. 2 is a configuration diagram of a drive unit positioned in a roof of the vehicle, as an embodiment of the present disclosure.

FIG. 3 is a rear diagram of the drive unit positioned in the roof of the vehicle, as an embodiment of the present disclosure.

FIG. 4 is a side cross-sectional diagram of the drive unit positioned in the roof of the vehicle, as an embodiment of the present disclosure.

FIG. 5 is a side cross-sectional diagram of a differential gear positioned in the roof of the vehicle, as another embodiment of the present disclosure.

It should be understood that the appended drawings are not necessarily to scale, presenting a somewhat simplified representation of various preferred features illustrative of the basic principles of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent parts of embodiments of the present disclosure throughout the several figures of the drawing.

DETAILED DESCRIPTION OF ILLUSTRATIVE EMBODIMENTS

Hereinafter, embodiments of the present disclosure will be described in more detail with reference to the accompanying drawings. The embodiments of the present disclosure may be modified in various forms, and the scope of the present disclosure should not be construed as being limited to the following embodiments. These embodiments are provided to more completely explain the present disclosure to those skilled in the art.

Further, the terms " . . . part," " . . . unit," " . . . member," and the like described in the specification mean a unit that performs at least one function or operation, which may be implemented as hardware or a combination of hardware and software.

Further, in the present specification, the names of the configurations are divided into 'first' and 'second' to distinguish them because the names of the configurations are the same, and are not necessarily limited to the order in the following description.

Further, in the present specification, configurations in which each of the first door and the second door having the same drive relationship and the drive unit are associated with each other may be described below by omitting descriptions of 'first' and 'second'.

Furthermore, in the present specification, 'door' is a concept of including both 'first door' and 'second door,' and 'spindle' and 'spindle unit' are a concept of including both 'first spindle' and 'second spindle.'

The embodiments of the present disclosure relate to a vehicle including a double opening type door, and to a bi-directional door opening structure 100. A first door 110 is configured so that the other end of the first door 110 close to the first end of the vehicle is rotatably opened to the upper end in the height direction with respect to one end adjacent to a roof 200, and is configured so that a first lower door 111 is positioned adjacent to the other end of the opened first door 110.

A second door 120 is configured so that the other end of the second door 120 close to the second end of the vehicle is rotatably opened in the height direction with respect to one end adjacent to the roof 200, and a second lower door 121 is formed adjacent to the other end of the opened second door 120.

The first door 110, the first lower door 111, the second door 120, and the second lower door 121 may be configured to include a locking part 130, respectively. Furthermore, if the first door 110 and the second door 120 are released from the locking part 130 according to a user's request, the first door 110 and the second door 120, which have been released from the locking part 130, may be configured to be opened by applying a driving force of a drive unit 140.

FIGS. 1A and 1B are side diagrams of an opening structure of a door that is opened to all two directions of a vehicle, as an embodiment of the present disclosure.

As illustrated, the drive unit 140 positioned in the roof 200 of the vehicle is included, and one end of the first door 110 is configured to be rotatably opened with respect to the first door no adjacent to the drive unit 140. Further, one end of the rear end of the second door 120 is configured to be rotatably opened with respect to the second door 120 adjacent to the rear end of the drive unit 140.

Furthermore, the lower surface of one end of the first door no rotatably opened may further include the first lower door 111 rotatably opened in a direction opposite to the direction in which the first door 110 is rotated, and the lower surface of one end of the opened second door 120 may also include the second lower door 121 rotatably opened in a direction different from that of the second door 120.

The drive unit 140 is configured to be positioned in the roof 200 of the vehicle, and is configured to be positioned adjacent to between the first door no and the second door 120. More preferably, both ends of the drive unit 140 are configured to be fastened to a first hinge part 112 positioned in the first door 110 and a second hinge part 122 positioned in the second door 120, and are configured to deliver an opening force applied by a driving part 141 to the first hinge part 112 and the second hinge part 122, respectively.

The drive unit 140 is composed of the driving part 141 for applying the opening force to the first door 110 and the second door 120, and a differential gear for delivering the driving force applied from the driving part 141 to a spindle unit 150 fastened to the first door 110 and the second door 120. The differential gear is configured so that the driving force applied from the driving part 141 is delivered to the spindle unit 150, and delivers the opening force so that the doors 110, 120, which have been unlocked by the driving force, are opened.

Therefore, it is formed so that the driving force is applied to each of spindles 151, 152 through the differential gear of the drive unit 140, and the unlocked door of the first door no and the second door 120 is configured to be opened by the driving force applied to the spindle.

More preferably, if a user's unlocking input is applied to the locking parts 130 positioned in the first door no and the second door 120, the drive unit 140 is configured to be driven to open the unlocked doors 110, 120 of the first door no and the second door 120.

Further, the spindle unit 150 is configured to serve as a damper of the door hinge parts 112, 122 if the opened doors 110, 120 are closed, and is configured to prevent the driving force for opening the door and a sudden drop state in a door closed state.

The locking part 130 is composed of a first locking part 130 for unlocking the first door no, and a second locking part 130 for unlocking the second door 120, and is configured so that the driving force is applied to the spindles 151, 152 according to the release input of the locking part 130.

The driving force applied to the spindles 151, 152 is configured to be converted into the opening force for the unlocked doors 110, 120.

The first locking part 130 and the second locking part 130 may be composed of a main locking part 132 and an auxiliary locking part 131, respectively, and are configured so that the driving force is applied to the corresponding spindle unit 150 according to the inputs of the main locking part 132 and the auxiliary locking part 131.

More preferably, in an embodiment of the present disclosure, the drive unit 140 is configured to be driven in response to the release input of the main locking part 132, and the first door 110 is configured to be opened by the first spindle 151 when the main locking part 132 and the auxiliary locking part 131 positioned in the first door 110 are released, and the second door 120 is configured to be opened by the second spindle 152 when the main locking part 132 and the auxiliary locking part 131 positioned in the second door 120 are released.

The unlocking input signal of the locking part 130 and the driving command of the driving part 141 may be controlled through a controller (not illustrated).

FIG. 2 is a side cross-sectional diagram of the drive unit 140.

As illustrated, it is configured so that the drive unit 140 is positioned in the roof 200 of the vehicle, the first door no is positioned at the first (front) end of the vehicle, and the second door 120 is positioned at the second (rear) end of the vehicle adjacent to each other.

The drive unit 140 includes the first spindle 151 fastened to the first hinge part 112 positioned inside the first door 110, and the second spindle 152 fastened to the second hinge part 122 positioned inside the second door 120.

The first hinge part 112 and the second hinge part 122 may be configured to include a fixing part fixed to the inside of the roof 200, and a rotational part configured to be rotated integrally with the first door 110 and the second door 120 around the fixing part.

The first spindle 151 and the second spindle 152, which are the spindle unit 150, are configured to extend in the longitudinal direction, if the driving force is delivered, and the differential gear is positioned between the spindle unit 150 and the driving part 141 so that the driving force of the driving part 141 is applied to the spindle unit 150.

In the differential gear, the driving force applied from the driving part 141 is simultaneously delivered to the first spindle 151 and the second spindle 152, and the spindles 151, 152 corresponding to the door that has been released from the locking part 130 extend in the longitudinal direction to apply the opening force to the doors 110, 120.

More preferably, the differential gear is configured so that the driving force is applied to the spindle unit 150 in response to the release input of the locking part 130 positioned in the first door no or the second door 120.

If the driving force of the driving part 141 is applied to the spindle unit 150 through the differential gear, one end of the spindle unit 150 is configured to push the hinge part positioned on the rear surface of the door in the longitudinal direction, and the hinge part is configured so that the end of the door is rotatably opened in the height direction of the vehicle around the fixing part fixed inside the roof 200.

More preferably, the bi-directional spindle unit 150 is configured so that the first spindle 151 and/or the second spindle 152 extends in the longitudinal direction in response to the user's release input of the locking part 130 to be configured to apply tension to the first hinge part 112 and/or the second hinge part 122, respectively.

The first hinge part 112 and the second hinge part 122 are configured so that the first door no and the second door 120 are opened by the spindle unit 150, respectively, and one end of the first door no and one end of the second door 120 are configured to be rotatably opened selectively or integrally with respect to one end adjacent to the drive unit 140.

In summary, if the release input of the locking part 130 positioned in the first door 110 or the release input of the locking part 130 positioned in the second door 120 is applied, the driving force of the drive unit 140 is applied to the spindle unit 150 to open the door to which the release input of the locking part 130 is applied, respectively, and the driving force is configured to be converted into the opening force for the unlocked doors 110, 120. Furthermore, if the unlocking is input at the same time, the first door no and the second door 120 are configured to be opened at the same time.

However, in an embodiment of the present disclosure that performs the opening and closing of the first door 110 and the second door 120 by using one driving part 141, if the unlocking input is sequentially applied, it is configured so that the opening of the preceding-inputted unlocking door is performed and then the opening of the trailing-inputted unlocking door is performed.

FIG. 3 is a rear diagram of the roof 200 in which the drive unit 140 is positioned.

As illustrated, the bi-directional door opening structure 100 is configured to include the drive unit 140 positioned in the roof 200. The drive unit 140 is configured to be mounted to a roof rail 210, and is configured so that both ends thereof are fastened to the first hinge part 112 and the second hinge part 122, respectively.

More preferably, in an embodiment of the present disclosure, at least one drive unit 140 is configured in the width direction of the vehicle.

The first door 110 and the second door 120 may be configured to include a glass part inside a panel part, and one end of the panel part is configured to face both ends of the drive unit 140, respectively.

More preferably, it is configured so that the first hinge part 112 positioned inside the first door no is fastened to the first spindle 151 of the drive unit 140 and the second hinge part 122 positioned inside the second door 120 is fastened to the second spindle 152 of the drive unit 140.

The first hinge part 112 and the second hinge part 122 are configured to be fastened to one end of the spindle unit 150 by a gooseneck hinge. Further, if each hinge part is fastened to one end of the spindle unit 150 and the other end thereof is fixed to the panel part inside each door to extend the spindle unit 150 in the longitudinal direction, the gooseneck hinge is configured to be rotated with respect to the inside of the roof 200.

That is, if the spindle unit 150 extends in the longitudinal direction, tension is applied to the hinge part in a direction away from the vehicle, and the hinge part composed of the gooseneck hinge is configured to be rotated with respect to the roof 200 so that each door is rotatably opened.

FIG. 4 is a side cross-sectional diagram of the drive unit 140 according to embodiments of the present disclosure.

As illustrated, the drive unit 140 fixed to the roof 200 includes the driving part 141, and includes a first gear 142 configured so that the rotational force of the driving part 141 is applied to the differential gear, and a second gear 143 fastened to the first gear 142 to apply the driving force to the spindle unit 150.

The second gear 143 may be composed of a connection gear 145 configured to be fastened to both ends of the spindle unit 150, and a main gear 144 connected with the first gear 142.

The second gear 143 is configured so that the driving force of the driving part 141 is applied to the spindles 151, 152 through the first gear 142, and the connection gear 145 is configured so that the spindles 151, 152 fastened to the unlocked doors 110, 120 extend in the longitudinal direction to convert the driving force of the first gear 142 into the opening force. Further, the spindles 151, 152 fastened to the doors for which the lock is not released are configured so that no additional driving force is applied through the connection gear.

The connection gear 145 of the second gear 143 may be configured to be fastened to the first spindle 151 and the second spindle 152 to be configured to drive the first spindle 151 and the second spindle 152 or to extend the first spindle 151 and the second spindle 152 in the longitudinal direction at the same time.

More preferably, the second gear 143 is configured so that the driving force applied to the spindle unit 150 is converted into the opening force to open the door corresponding to the user's release input of the locking part 130, and is configured to selectively open the doors 110, 120 in interlock with the locking part 130.

Larger resistance is generated in the spindles corresponding to the doors 110, 120 in which the locking part 130 is not released compared to the doors 110, 120 in the unlocked state, and the rotational force of the driving part 141 is applied only to the spindle having no resistance according to the resistance so that only the door in the unlocked state is opened.

Further, if the first door 110 and the second door 120 are sequentially opened as the differential gear is driven by using one driving part 141 (motor), it is configured so that the opening of the preceding-opened door is completed and the opening of the additional door is completed according to an opening signal of the trailing-inputted door.

That is, if the driving force of one driving part 141 is temporarily dispersed by the door that is unlocked with a time difference, the door being opened may be dropped, such that embodiments of the present disclosure are configured to open the preceding-inputted door and then to open the trailing-inputted door if the door release input is applied sequentially.

The drive unit 140 includes the driving part 141 including a housing and positioned inside the housing, the differential gear fastened to the driving part 141, and the spindle unit 150 positioned lengthwise in the front and rear directions of the vehicle.

The spindle unit 150 is configured to include the first spindle 151 and the second spindle 152, and is configured to be rotated by the fastening of the differential gear to extend in both directions of the vehicle. The spindle unit 150 may be composed of a rotational part 155 fastened to the differential gear to be rotated, and a tube part 154 configured to surround the rotational part 155 and configured to extend in the longitudinal direction of the spindles 151, 152.

The tube part 154 may be configured so that the rotational part 155 is drawn in, thereby performing a function of a hydraulic cylinder.

Therefore, if the opened door is closed, the rotational part 155 is configured to be drawn into the tube part 154 according to the weight of the door, and is configured to prevent the sudden draw-in of the rotational part 155.

The end of the spindle is configured to include a ball bearing 153 configured to be fastened to the hinge part, and if one end of the spindle unit 150 including the ball bearing 153 is extended, tension is configured to be applied to the hinge part in a direction away from the vehicle.

The hinge part includes the fixing part configured so that one end close to the drive unit 140 is fixed to the roof 200 of the vehicle and the rotational part is rotated around the fixing part. The rotational part is configured to be fastened to the ball bearing 153 of the spindle unit 150 to be configured so that the rotational part is rotated around the fixing part according to the longitudinal extension of the spindle unit 150.

FIG. 5 illustrates a clutch 300 configured to be positioned in the second gear 143 to be fastened selectively to the spindle unit 150, as another embodiment of the present disclosure.

The drive unit 140 is configured to be positioned in the roof 200 of the vehicle to rotate the first gear 142 in response to the user's release input of the locking part 130, and to rotate the second gear 143 connected to the first gear 142 to extend the spindle unit 150.

Furthermore, another embodiment of the present disclosure is configured to include the clutch 300 configured to be fastened selectively to the second gear 143.

The clutch 300 is configured to perform the forced restraint with the second gear 143 and the spindles 151, 152, and is a configuration for preventing the driving force applied to each of the spindles 151, 152 from changing if the first door no and the second door 120 are opened sequentially. The clutch 300 may be configured to be positioned at the front end and the rear end with respect to the second gear 143, respectively, and includes a first clutch 310 configured to correspond to the first spindle 151, and a second clutch 320 positioned to correspond to the second spindle 152.

More preferably, the first clutch 310 is positioned to be fixed to the first spindle 151, and the first clutch 310 is configured to be additionally fastened to the second gear 143 by a pressure member 330, and a constant rotational force may be applied to the first spindle 151.

Further, the second clutch 320 is positioned to be fixed to the second spindle 152, and the second clutch 320 is configured to be additionally fastened to the second gear 143 by a pressure member 340, and a constant rotational force may be applied to the second spindle 152.

That is, the clutch 300 is configured so that a continuous and consistent driving force may be applied to the spindles 151, 152.

The first clutch 310 fastened to the first spindle 151 is configured to be fastened to the second gear 143 in response to the release input of the first locking part 130. More preferably, the first pressure member 330 provides a constant pressure so that the first clutch 310 and the second gear 143 are fastened to each other, and a continuous driving force from the second gear 143 may be applied to the first spindle 151 fastened to the second gear 143 to be rotated.

Another embodiment of the present disclosure may include the first clutch 310 and the second clutch 320 at a corresponding position in the longitudinal direction of the vehicle, and may further include the second pressure member 340 for providing a pressure so that the second clutch 320 is fastened to the second gear 143.

The pressure members 330, 340 may be composed of a rack gear fastened to driving members 350, 360, and an embodiment of the present disclosure is configured so that the pressure members 330, 340 that may be moved in the height direction of the vehicle are moved downwards by the driving members 350, 360 composed of a motor to apply a pressure to the rear surface of the corresponding clutch 300, respectively, and the clutch 300 and the second gear 143 are configured to be fastened to each other.

More preferably, the first pressure member 330 is configured to interlock with the first driving member 350, and the second pressure member 340 is configured to interlock with the second driving member 360. The clutch 300 fastened to the second gear 143 is configured to be rotated integrally with the corresponding spindles 151, 152, and the spindles 151, 152 having received the continuous rotational force from the fastening between the clutch 300 and the second gear 143 are configured to extend in the front and rear directions of the vehicle.

As described above, the clutch 300 is driven to be fastened to the second gear 143 in response to the user's release input of the locking part 130, and the spindles 151, 152 having received the stable rotational force from the second gear 143 rotate to extend in the longitudinal direction. Further, the hinge parts 112, 122 fastened to ends of the spindles 151, 152 are configured to receive tension so that the door is opened rotatably.

If the clutch 300 is released from the second gear 143, a return spring 370 for applying an elastic force to return the clutch 300 is included.

More preferably, the case where the clutch 300 is released from the second gear 143 by the return spring 370 may include the fully opened state of the door and the fully closed state of the door.

In summary, the driving members 350, 360 are driven so that the clutch 300 facing the doors 110, 120 to which the unlocking input is applied is fastened to the second gear 143, and the pressure members 330, 340 for applying a predetermined pressure to the rear surface of the clutch 300 are configured to be moved so that the clutch 300 corresponding to the unlocked doors 110, 120 is fastened to the second gear 143.

Furthermore, if the doors 110, 120 are in the fully closed state or the doors 110, 120 are in the fully opened state, the clutch 300 may be configured to be spaced apart from the second gear 143 through the return spring 370.

The foregoing detailed description exemplifies embodiments of the present disclosure. Further, the above-mentioned contents illustrate and explain preferred embodiments of the present disclosure, and the present disclosure may be used in various other combinations, changes, and environments. That is, changes or modifications may be made within the scope of the concept of the disclosure disclosed in this specification, the scope equivalent to the disclosed contents, and/or the scope of the skill or knowledge in the art. The described embodiments explain the best state for implementing the technical spirit of the present disclosure, and various changes required in the specific application field and use of the present disclosure are possible. Therefore, the detailed description of the disclosure described above is not intended to limit the present disclosure to the disclosed embodiments. Further, the appended claims should be construed to also include other embodiments.

What is claimed is:
1. A bi-directional door opening structure, comprising:
   a front door configured to be rotatably opened with respect to a front hinge part positioned in a roof of a vehicle;

a rear door configured to be rotatably opened with respect to a rear hinge part positioned in the roof of the vehicle; and a drive unit positioned in the roof at a point where the front door and the rear door are adjacent to each other, and configured to apply an opening force to the front door and the rear door, wherein the drive unit comprises:

a spindle unit configured to open at least one of the front door and the rear door, which has been unlocked by a driving force applied from a driving part; and a differential gear configured to deliver the driving force between the spindle unit and the driving part; and wherein the differential gear comprises a first gear fastened to the driving part and configured to apply a rotational force and a second gear fastened to the first gear and configured to apply the driving force to the spindle unit; and wherein a front spindle of the spindle unit faces the front door and is configured to be moved by the second gear in a longitudinal direction, and a rear spindle of the spindle unit faces the rear door and is configured to be moved by the second gear in the longitudinal direction.

2. The bi-directional door opening structure of claim 1, wherein the second gear comprises:

a main gear fastened to the first gear; and a connection gear configured to deliver the driving force applied through the main gear to each of the front spindle and the rear spindle.

3. The bi-directional door opening structure of claim 1, wherein:

the front hinge part faces the front spindle; and
the rear hinge part faces the rear spindle.

4. The bi-directional door opening structure of claim 3, wherein one end of the front spindle facing the front hinge part and one end of the rear spindle facing the rear hinge part include a ball bearing configured to apply tension to the front hinge part and the rear hinge part.

5. The bi-directional door opening structure of claim 1, further comprising at least one locking part configured to lock and unlock at least one of the front door or the rear door.

6. The bi-directional door opening structure of claim 5, wherein the second gear is configured to open the front door or the rear door by driving the spindle unit facing the front door or the rear door, which has been unlocked.

7. The bi-directional door opening structure of claim 1, further comprising a clutch unit configured to be fastened selectively to the second gear, wherein the clutch unit comprises:

a front clutch fixed to the front spindle; and
a rear clutch fixed to the rear spindle.

8. The bi-directional door opening structure of claim 7, further comprising a pressure member positioned so that the front clutch and the rear clutch are fastened to the second gear, wherein the pressure member is configured to be moved so that the front clutch or the rear clutch corresponding to an unlocked door is fastened to the second gear, if a locking part of the front door or the rear door is released.

9. The bi-directional door opening structure of claim 7, wherein the clutch unit comprises:

a pressure member comprising a rack gear; and
a driving member configured to perform a vertical movement of the pressure member so that the clutch unit is fastened to the second gear.

10. The bi-directional door opening structure of claim 9, wherein the clutch unit further comprises a return spring configured to return when pressure of the pressure member is released.

11. The bi-directional door opening structure of claim 1, wherein the drive unit is configured to open a preceding-inputted unlocking door and then to open a trailing-inputted unlocking door according to a sequentially-inputted door unlocking input.

12. The bi-directional door opening structure of claim 1, wherein the drive unit is configured in a width direction of the vehicle.

13. A vehicle comprising:

a vehicle body;
a roof connected to the vehicle body;
a front door connected to the vehicle body at a front end of the vehicle, the front door configured to be unlocked by a driving force applied from a driving part;
a rear door connected to the vehicle body at a rear end of the vehicle, the rear door configured to be unlocked by the driving force applied from the driving part; and
a bi-directional door opening structure, comprising:
a front hinge part positioned in the roof of the vehicle and coupled to the front door;
a rear hinge part positioned in the roof of the vehicle and coupled to the rear door; and
a drive unit positioned in the roof of the vehicle at a point where the front door and the rear door are adjacent to each other, and configured to apply an opening force to the front door and the rear door;
wherein the drive unit comprises a spindle unit configured to open at least one of the front door and the rear door unlocked by the driving force applied from the driving part and a differential gear configured to deliver the driving force between the spindle unit and the driving part;
wherein the differential gear comprises a first gear fastened to the driving part and configured to apply a rotational force and a second gear fastened to the first gear and configured to apply the driving force to the spindle unit;
wherein a front spindle of the spindle unit is configured to face the front door and be moved by the second gear in a longitudinal direction, and a rear spindle of the spindle unit is configured to face the rear door and be moved by the second gear in the longitudinal direction;
wherein the second gear comprises a main gear fastened to the first gear and a connection gear configured to deliver the driving force applied through the main gear to each of the front spindle and the rear spindle; and
wherein the front hinge part faces the front spindle and the rear hinge part faces the rear spindle.

14. The vehicle of claim 13, wherein one end of the front spindle facing the front hinge part and one end of the rear spindle facing the rear hinge part each include a ball bearing configured to apply tension to the front hinge part and the rear hinge part.

15. The vehicle of claim 13, further comprising:

a clutch unit configured to be fastened selectively to the second gear, wherein the clutch unit comprises:
a front clutch fixed to the front spindle; and
a rear clutch fixed to the rear spindle; and
a pressure member positioned so that the front clutch and the rear clutch are fastened to the second gear, wherein the pressure member is configured to be moved so that the front clutch or the rear clutch corresponding to an unlocked door is fastened to the second gear, if a locking part of the front door or the rear door is released.

16. The vehicle of claim 13, further comprising a clutch unit configured to be fastened selectively to the second gear, wherein the clutch unit comprises:
a front clutch fixed to the front spindle;
a rear clutch fixed to the rear spindle;
a pressure member comprising a rack gear;
a driving member configured to perform a vertical movement of the pressure member so that the clutch unit is fastened to the second gear; and
a return spring configured to return when pressure of the pressure member is released.

17. The vehicle of claim 13, wherein the front hinge part is configured to rotatably open the front door in response to the opening force and wherein the rear hinge part is configured to rotatably open the rear door in response to the opening force.

18. A bi-directional door opening structure, comprising:
a front hinge part positioned in a roof of a vehicle and configured to be coupled to a front door of the vehicle;
a rear hinge part positioned in the roof of the vehicle and configured to be coupled to a rear door of the vehicle; and
a drive unit positioned in the roof of the vehicle at a point where the front door and the rear door are adjacent to each other, and configured to apply an opening force to the front door and the rear door, wherein the drive unit comprises:
a spindle unit configured to open at least one of the front door and the rear door, which has been unlocked by a driving force applied from a driving part; and
a differential gear configured to deliver the driving force between the spindle unit and the driving part, the differential gear comprising a first gear fastened to the driving part and configured to apply a rotational force and a second gear fastened to the first gear and configured to apply the driving force to the spindle unit,
wherein a front spindle of the spindle unit faces the front door and is configured to be moved by the second gear in a longitudinal direction, and a rear spindle of the spindle unit faces the rear door and is configured to be moved by the second gear in the longitudinal direction, and
wherein the second gear comprises a main gear fastened to the first gear and a connection gear configured to deliver the driving force applied through the main gear to each of the front spindle and the rear spindle.

19. The bi-directional door opening structure of claim 18, further comprising a clutch unit configured to be fastened selectively to the second gear, wherein the clutch unit comprises:
a front clutch fixed to the front spindle;
a rear clutch fixed to the rear spindle;
a pressure member comprising a rack gear;
a driving member configured to perform a vertical movement of the pressure member so that the clutch unit is fastened to the second gear; and
a return spring configured to return when pressure of the pressure member is released.

20. The bi-directional door opening structure of claim 18, wherein the front hinge part is configured to rotatably open the front door in response to the opening force and wherein the rear hinge part is configured to rotatably open the rear door in response to the opening force.

* * * * *

UNITED STATES PATENT AND TRADEMARK OFFICE
CERTIFICATE OF CORRECTION

PATENT NO. : 11,603,682 B2
APPLICATION NO. : 16/891361
DATED : March 14, 2023
INVENTOR(S) : Ki Hyun Cho Page 1 of 1

It is certified that error appears in the above-identified patent and that said Letters Patent is hereby corrected as shown below:

On the Title Page

Item (73) Assignees; Line 2, delete "Cornoration" and insert --Corporation--.

Signed and Sealed this
Eleventh Day of April, 2023

Katherine Kelly Vidal
*Director of the United States Patent and Trademark Office*